US005549332A

United States Patent [19]
Judson

[11] Patent Number: 5,549,332
[45] Date of Patent: * Aug. 27, 1996

[54] TRAVEL PLANNER

[76] Inventor: Nancy L. Judson, 152 E. 94 St., New York, N.Y. 10128

[ * ] Notice: The portion of the term of this patent subsequent to Mar. 12, 2008, has been disclaimed.

[21] Appl. No.: 1,792

[22] Filed: Jan. 8, 1993

Related U.S. Application Data

[63] Continuation-in-part of Ser. No. 959,159, Oct. 9, 1992, abandoned.

[51] Int. Cl.⁶ .................................................. G09B 29/00
[52] U.S. Cl. ............................ 283/34; 283/117; 434/150
[58] Field of Search .............................. 283/34, 37, 39, 283/117, 116; 434/150, 153, 368, 369, 370

[56] References Cited

U.S. PATENT DOCUMENTS

| | | | |
|---|---|---|---|
| 980,673 | 1/1911 | Quidor | 434/150 |
| 2,291,683 | 8/1942 | Boothe, Jr. | 434/150 |
| 2,294,276 | 8/1942 | Callinicos | 283/34 |
| 2,316,786 | 4/1943 | Gottlieb | 283/34 X |
| 2,352,413 | 6/1944 | Schuch et al. | 434/150 |
| 2,486,502 | 11/1949 | Spafford | 283/34 X |
| 2,539,286 | 1/1951 | Thompson | 283/34 |
| 2,889,638 | 6/1959 | Anderson | 283/34 |
| 3,487,133 | 12/1969 | Lindsay | 434/152 |
| 3,849,913 | 11/1974 | Williams, Sr. | 434/150 |
| 4,271,596 | 6/1981 | Ganis | 283/34 X |
| 4,673,197 | 6/1987 | Shtipelman et al. | 283/34 |

FOREIGN PATENT DOCUMENTS

| 23340 | of 1906 | United Kingdom | 434/150 |
|---|---|---|---|

Primary Examiner—Frances Han
Attorney, Agent, or Firm—Hopgood, Calimafde, Kalil & Judlowe

[57] ABSTRACT

A travel planner including a transparent or translucent Combined Region/Topical Map that allows the user to plan a route directly on the map. The size of the region can range from a city or a portion thereof to a country or continent. Two or more Combined Region/Topical Maps can be overlaid such that the regional information is registered, whereby the user can plan a trip as may be desired to visit more than one type of point of interest (e.g., a castle and an historic village). This travel planner easily enables the traveler to create an itinerary based on personal interests by overlaying Combined Region/Topical Maps depicting desired interest types, each Combined Region/Topical Map depicting specific sites and locations of interest. In addition to such tourist information as the location of castles, museums, or camping locations, such Combined Region/Topical Maps can include such information as the locations of hotels, car rental companies, or pavilions for major events.

15 Claims, 8 Drawing Sheets

5,549,332

TRAVEL PLANNER

This application is a continuation-in-part of application Ser. No. 959,159, filed Oct. 9th, 1992, now abandoned.

BACKGROUND OF THE INVENTION

This invention relates generally to trip planning and more specifically to a modular trip planner which allows an individual to plan a trip based on specific interests and desires in the region to be visited.

U.S. Pat. No. 4,998,752 ("the '752 patent"), which is incorporated herein by reference, overcomes obstacles to efficient trip planning posed by traditional travel aids. The '752 patent presents a method and device by which a user can overlay Topical Maps onto a specially designed Region Map to locate where sites, attractions, and other noteworthy places of interest falling within the user's interests are found or clustered within the region.

A feature of the '752 patent is that the Region Map, which is typically constructed of regular paper or cardboard, is located underneath the transparent Topical Map. As such, there is no convenient way for users to write or mark out their preferred travel route directly on the Region Map.

SUMMARY OF THE INVENTION

Accordingly, it is the object of the present invention to provide a yet more efficient method for personalized trip planning by enabling the user to write or otherwise mark a "dot-to-dot" travel route directly on a Region map made of a flexible transparent material which is placed over one or more Topical interest maps, or on a Combined Region/Topical Map made of a flexible transparent material. As described, the Combined Region/Topical Map integrates the regional information of the Region Map and the topical information of the Topical Map into one map.

It is a further object of this invention to provide a simplified, flexible, compact and efficient planner and system that allows the user to plan a customized itinerary.

In summary, the invention in one embodiment is a novel travel planner that allows the user to customize a travel route based on specific topical interests, and to plan travel more efficiently than with traditional travel information products, and more particularly includes a Combined Region/Topical Map. The structural design of the invention is superior because it enables the user to write or otherwise mark a "dot-to-dot" travel route directly on one or more special interest (Topical) maps to customize a travel route, or on a single Combined Region/Topical Map without having to use separate Region and Topical Maps. The latter embodiment simplifies travel planning by reducing the number of maps needed because each Combined Region/Topical Map includes both regional and topical information. Additionally, these Combined Region/Topical Maps allow for reduced manufacturing costs because of the effective combination of information onto a single map.

BRIEF DESCRIPTION OF THE DRAWINGS

The following drawings are also shown and described in U.S. Pat. No. 4,998,752, and are briefly described as follows.

all according to the invention described in the aforementioned U.S. Pat. No. 4,998,752.

Figure 1:
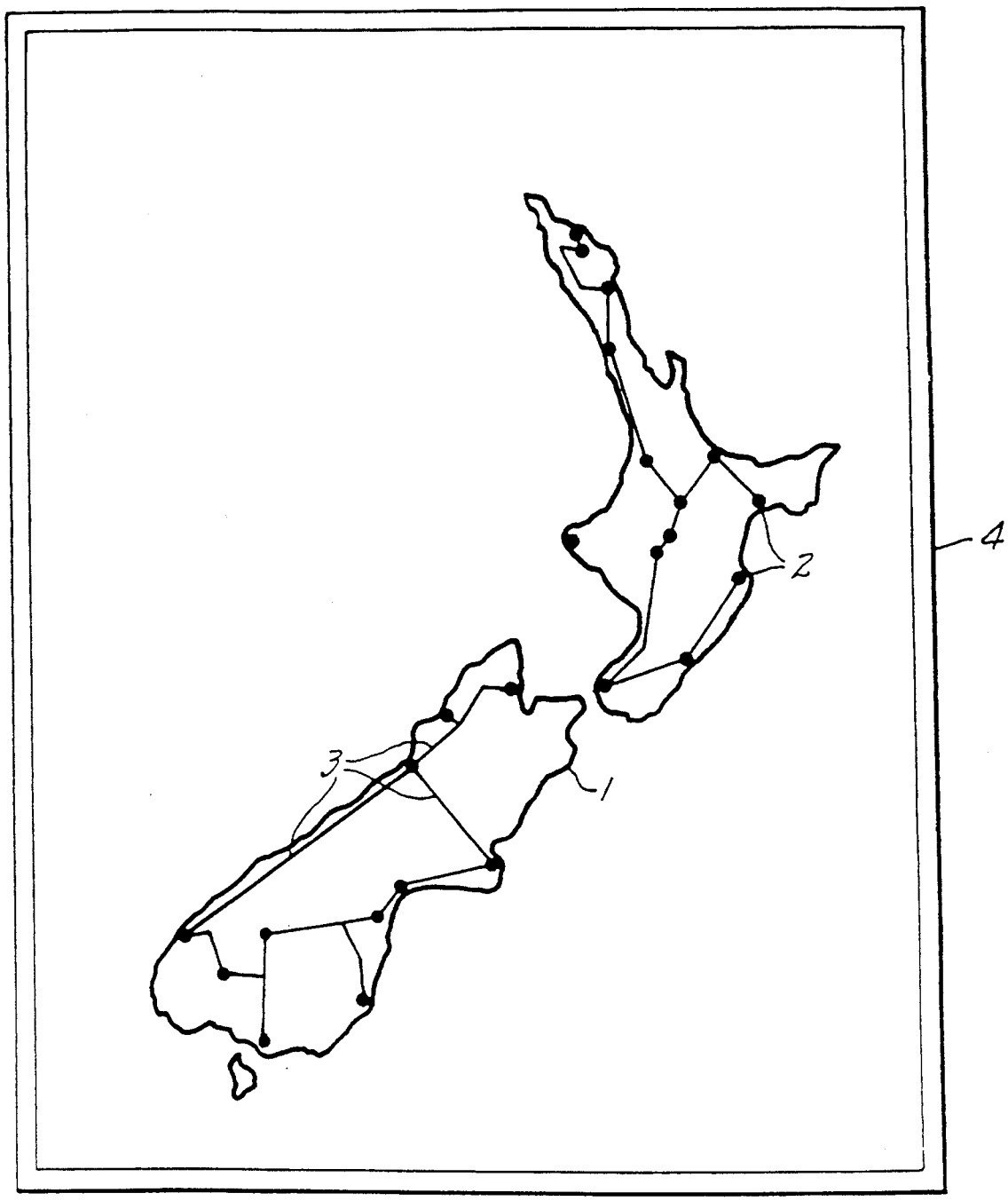
FIG. 1 is a plan view of a base map with the outline of a geographical area showing major cities as dots and routes as lies connecting the dots.
Figure 2:
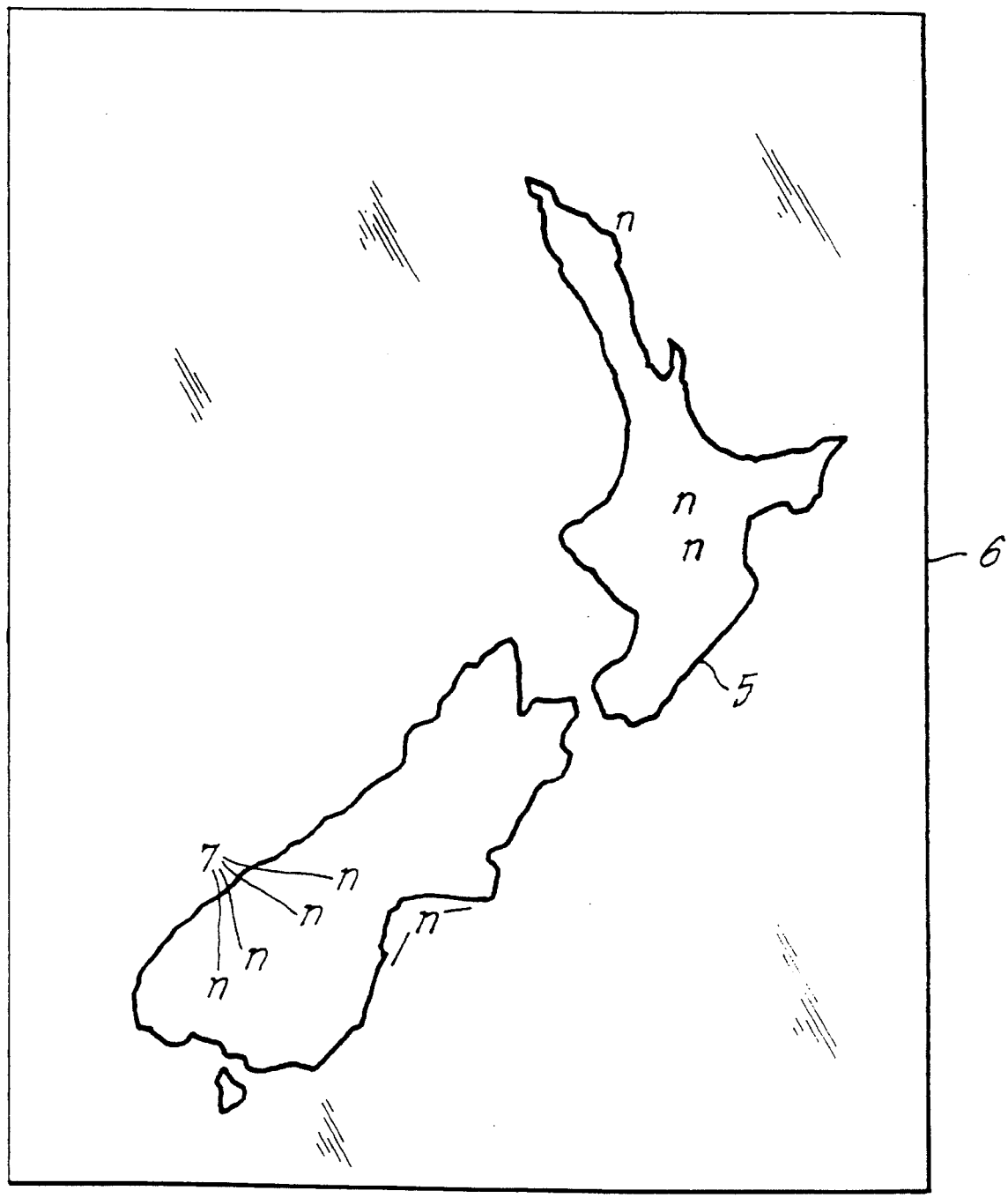
FIG. 2 is a plan view of a transparency showing an outline of the geographical area of FIG. 1 with the locations of unique planning interests shown as numbers.
Figure 3:
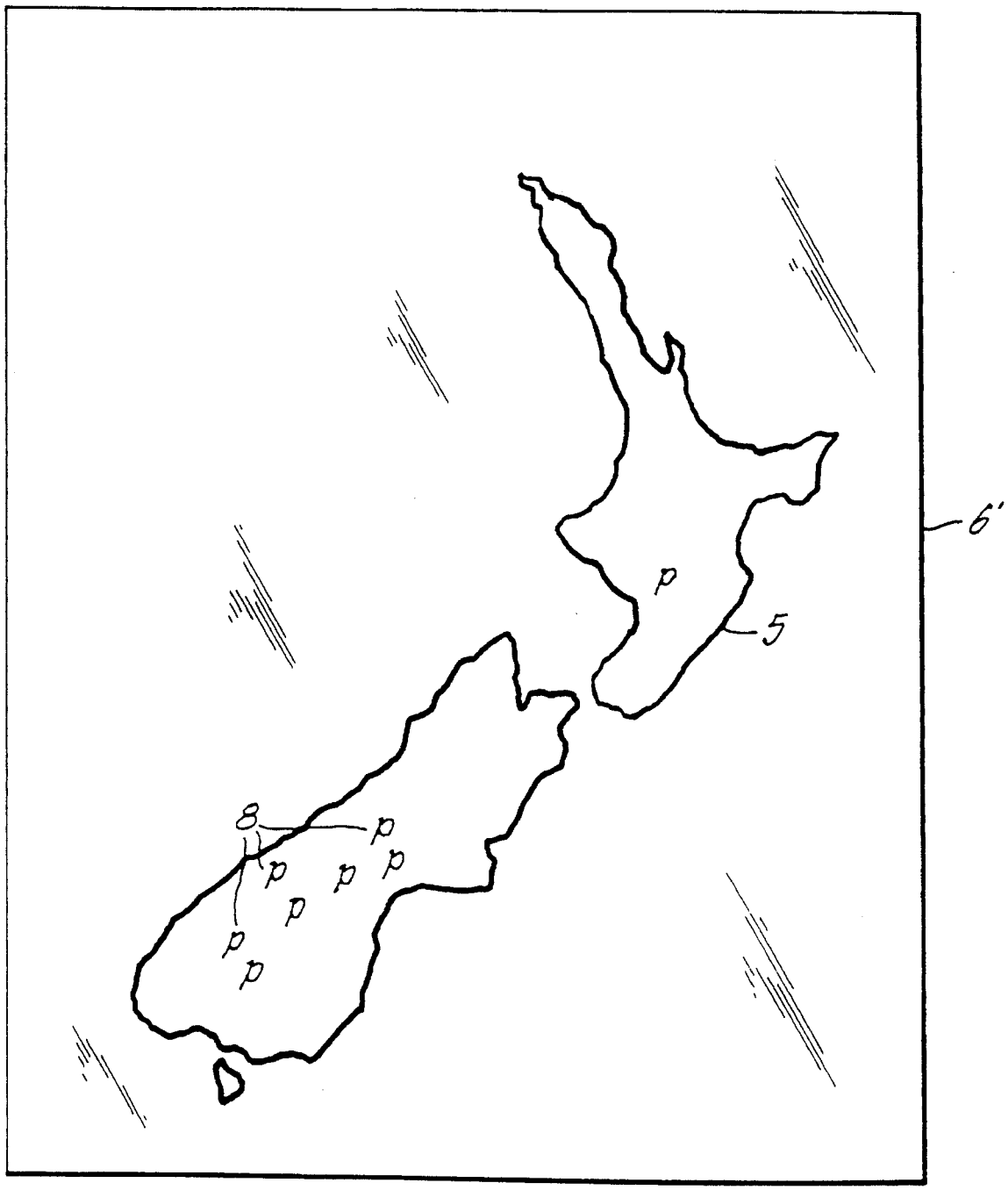
FIG. 3 is a plan view of a transparency showing an outline of the geographical area of FIG. 1 showing the locations of unique planning interests which differ from those shown in FIG. 2.
Figure 4:
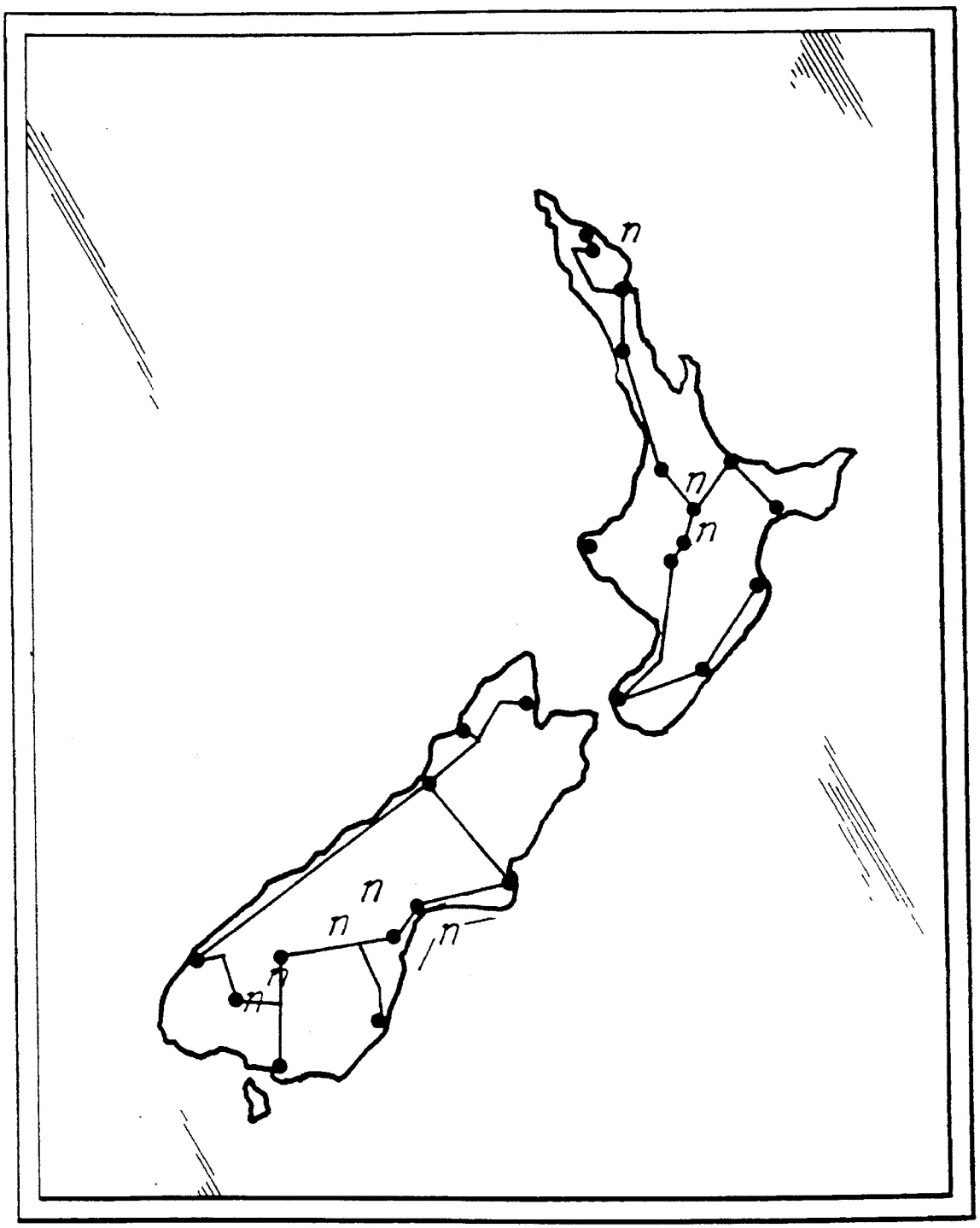
FIG. 4 is a plan view of the FIG. 1 map with the FIG. 2 transparency overlaid thereon.
Figure 5:
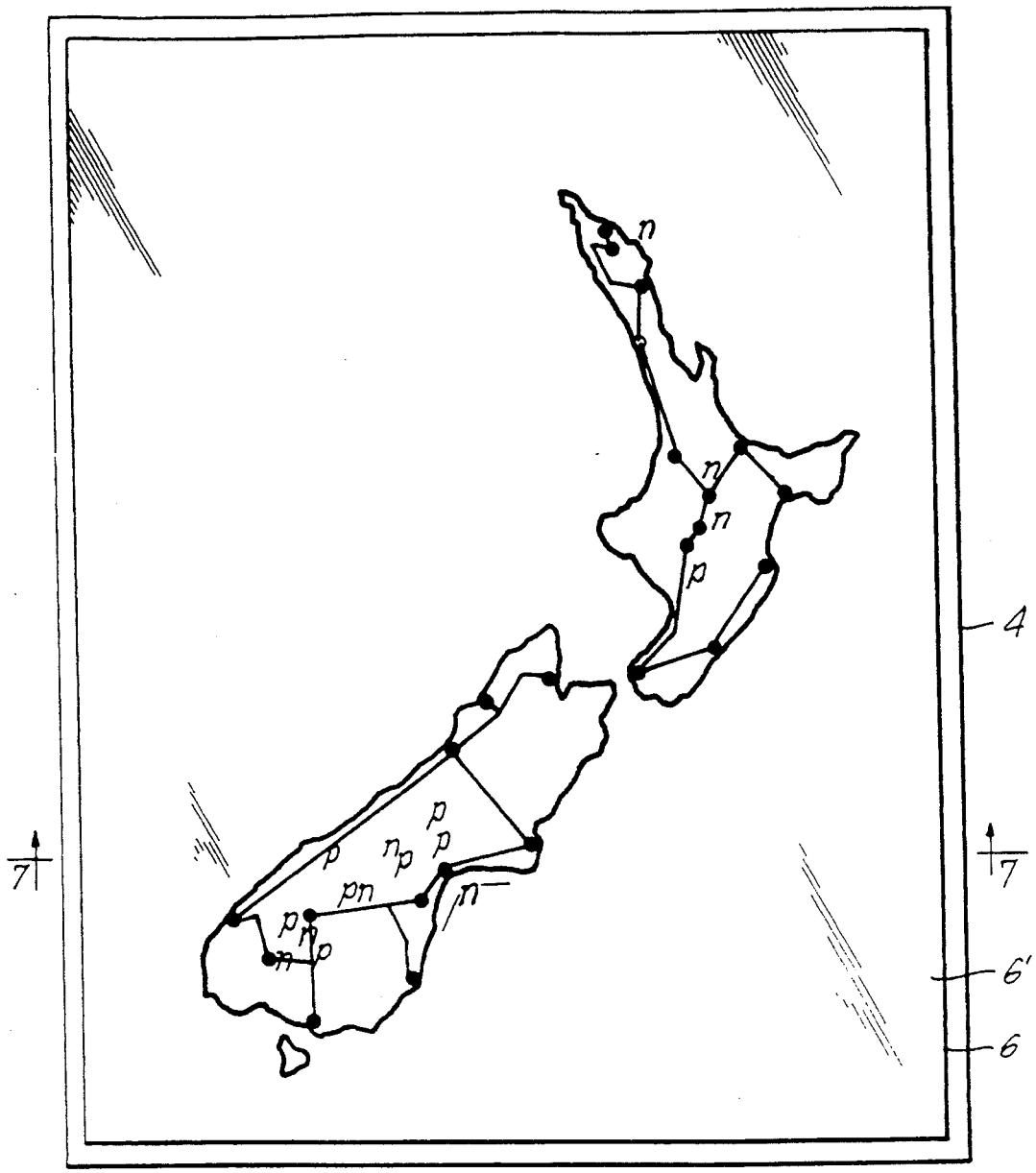
FIG. 5 is a plan view of the FIG. 4 composite with the FIG. 3 transparency overlaid thereon.
Figure 6:
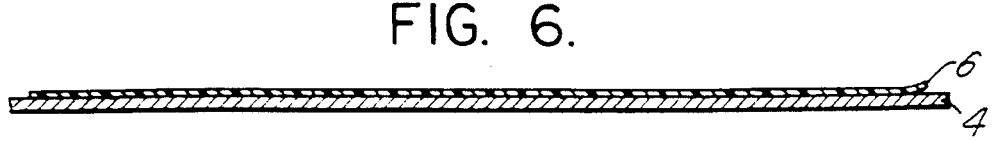
FIG. 6 is an enlarged transverse section on the line 6—6 in FIG. 4 looking in the direction of the arrows.
Figure 7:
FIG. 7 is an enlarged transverse section on the line 7—7 in FIG. 5 looking in the direction of the arrows.
Figure 8:
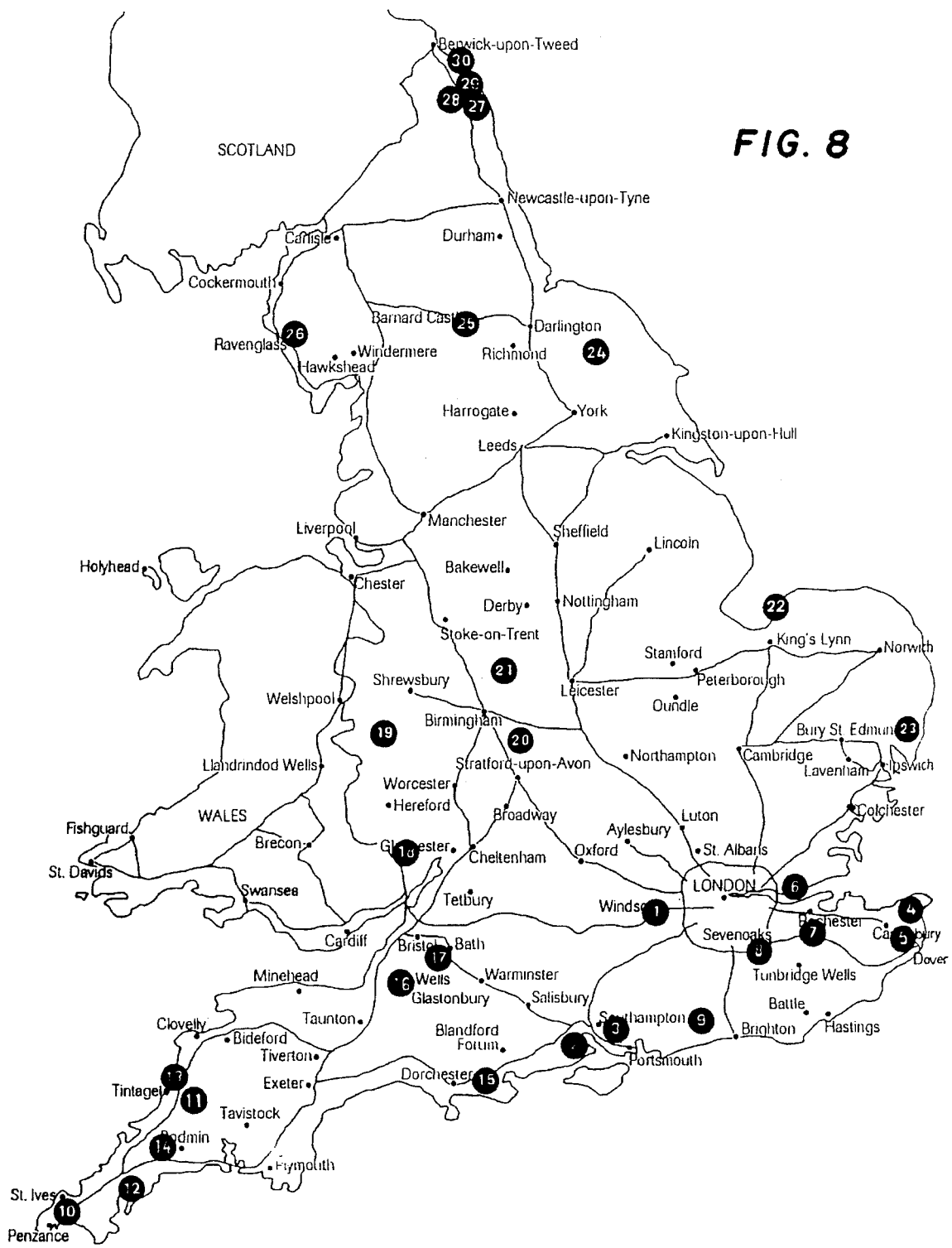
Figure 9:
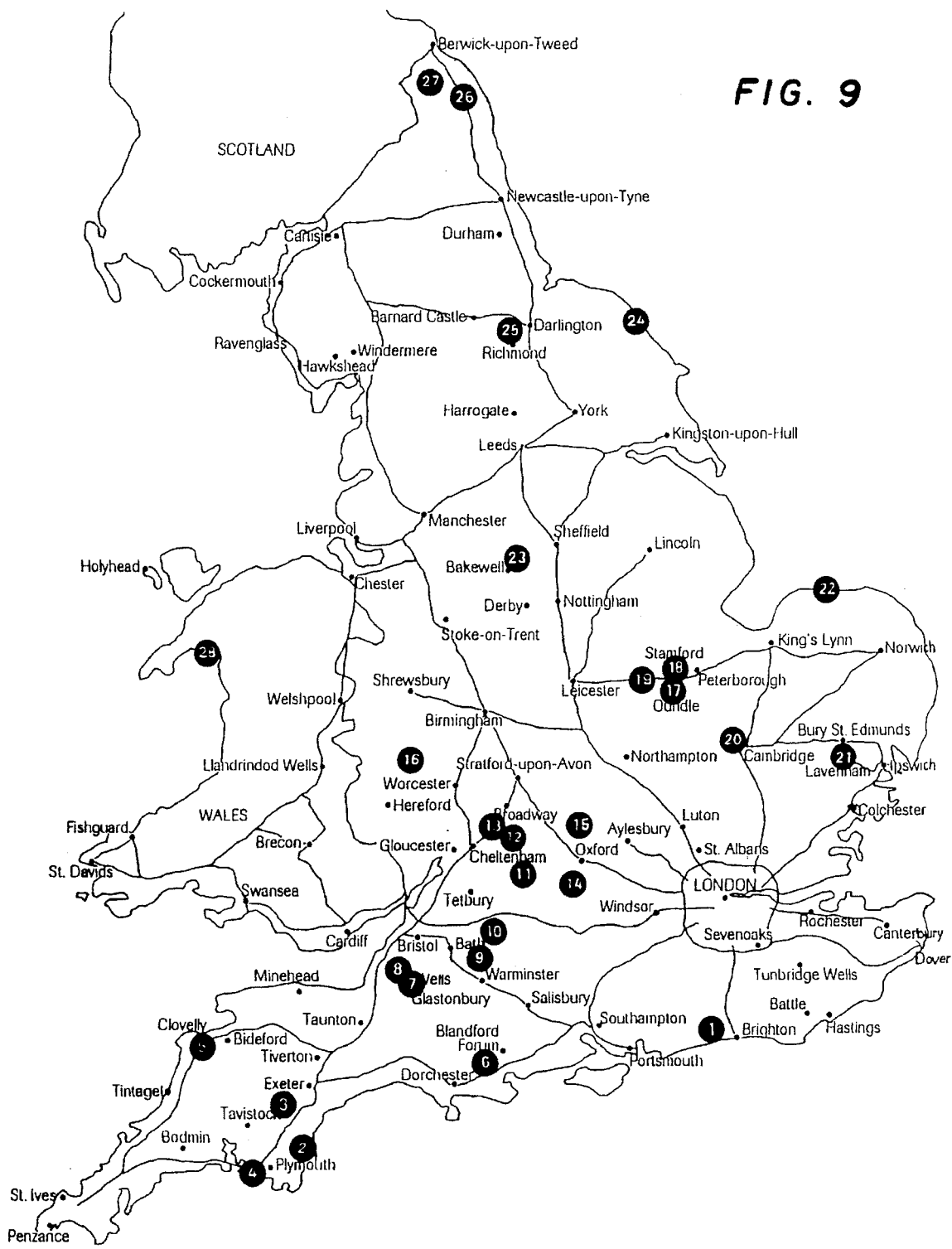

FIGS. 8 and 9 depict Combined Region/Topical Maps according to this invention which show, respectively, certain Historic Castles and Charming Villages located in England.

Figure 10:
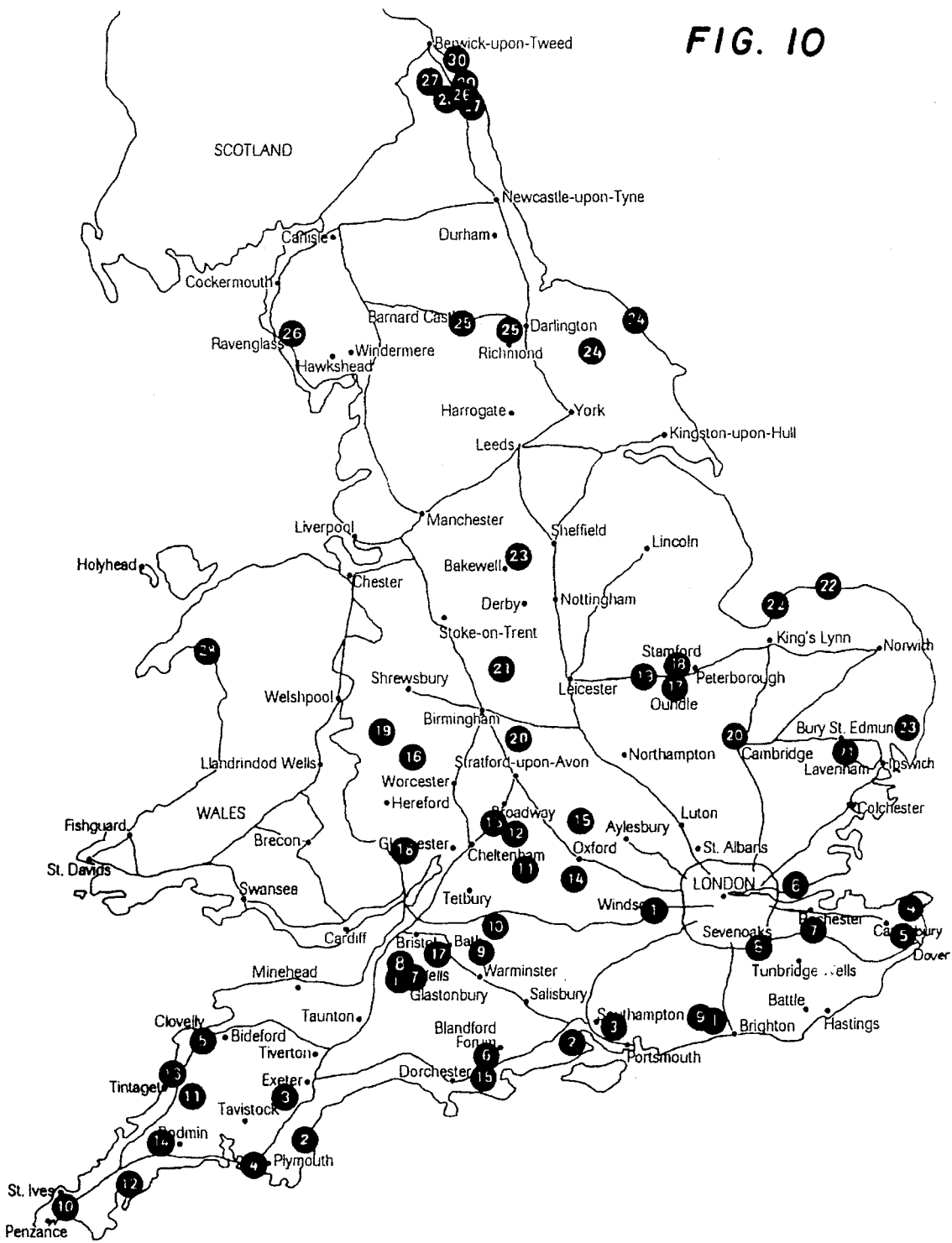

FIG. 10 depicts the Combined region/Topical Maps shown in FIGS. 8 and 9 which have been overlaid (onto each other).

DETAILED DESCRIPTION OF SPECIFIC EMBODIMENTS

In general, this invention and that of the aforementioned patent involve the use of certain maps. The Region Map generally contains regional information such as the geographic extent (outline) of the locale to be visited, a city, state, country, or the like. According to the present invention, the regional information may also include, without limitation, such other geographic and/or regional information as roads, rail routes, rivers and other bodies of water, mountains, and major cities in the region to be visited. The Topical Map includes an outline of the geographic extent of the region and topical information such as the location of sites of a particular topical interest e.g., historic castles). This topical information is marked or identified on the Topical Map by numbers, colors, and/or distinctive symbols (e.g., circles, squares, triangles, etc.), and combinations thereof. The various Topical Maps may each be accompanied by a booklet or other literature which contains descriptive information relating to and corresponding with the sites marked on the map.

In the aforementioned patent incorporated herein by reference, in order to plan a trip, onto a base map one or more transparent maps are overlaid so that the user can determine where in the region various topical points of interest lie.

As an improvement thereto, in one embodiment, the present invention provides the user with a Region Map for each Topical Map; that is, a country, region, or state map which denotes the location of certain geographical features, including but not limited to such features as roads, routes, and major cities. As such, the Region Map of this invention is analogous to the "base map" of the aforementioned U.S. Pat. No. 4,998,752, in which the base map is described as a paper or cardboard map of a country, state, or region, being topographical, and showing major cities and roads. The Region Map is printed on a suitable transparent sheet which has a surface on which the user can write. Accordingly, as opposed to the base map of U.S. Pat. No. 4,998,752, the Region Map of this invention is transparent, although it contains the same or similar information as would be contained in the base map of that patent.

In order to plan a trip using this embodiment, the Region Map is laid over special interest maps, called Topical Maps. Topical maps are created by printing an outline of a country, state, or region on a flexible transparent sheet and marking the locations of sites within the topical interest area on the transparent Region Map. The site locations can be marked by numbers, colors, or distinctive symbols on the Topical Map. The various topical maps may be each accompanied by booklet(s) which contain descriptive information relating to the sites marked on the Topical Map.

By stacking the Region Map on top of one or more special interest Topical Maps, the user may easily construct the travel route that combines the site locations set forth on the various Topical Maps. According to the disclosure of U.S. Pat. No. 4,998,752, in using the trip planner of that invention, the user places transparencies (topical maps as used herein) on top of the paper or cardboard base map (analogous to the region map as used herein). Instead, in one embodiment of the present invention, the user stacks the Region Map on top of the Topical Maps.

The Travel Planner may be contained in a compactly organized manner, such as in a mechanical binder having compartments or sections for the various components of the planner.

In another embodiment, this invention simplifies the planning of a trip by reducing the number of maps the traveler needs to coordinate in order to plan the trip. Further, the reduced number of maps, and the at least partially common regional information on the Combined Region/Topical Maps, means that there are fewer maps to see through, and so planning a trip is again made easier.

The Combined Region/Topical Map according to one embodiment of this invention is a single map which integrates both the regional and topical information. The Combined Region/Topical Map is preferably printed on a suitable transparent sheet, and preferably has a surface on which the user can write or draw. For purposes of this application, "transparent" connotes such materials as mylar, acetate, and velum, and similar transparent and translucent materials. The "writability" of the Combined Region/Topical Map enables the user to write, draw, or otherwise mark a "dot-to-dot" or location-to-location travel route directly on the map. The user may also efficiently preserve on the region map notes, questions, observations, or other personalized information gathered before, during, or even after travel.

In this embodiment, the topical information is combined with the regional information to create a Combined Region/Topical Map. The topical information includes indicia showing the sites of locations of a particular topical interest to the traveler; topical information may include such points of interest as charming or historic villages, stately homes, castles, country gardens, museums, cathedrals, shopping locations, country markets, wineries, sporting or camping locations, and/or other such topical points of interest as there may be desire to visit in the particular region.

Examples of such Combined Region/Topical Maps are shown in FIGS. 8 and 9. As seen, these maps include an outline of the region predominantly including England, and further include major roads and large or well-known cites as part of the regional information. Each Combined Region/Topical Map includes a legend, "Historic Castles" and "Charming Villages" respectively for FIGS. 8 and 9, and marks the particular sites of the points of interest as noted by numbered circles. Thus, the user can conveniently plan and write, on a single map, a route to see desired castles or villages (or whatever points of interest are shown on the map). It is preferred that the travel planner of this invention include a booklet or other text which describes each of the points of interest that are shown on the combined Region/Topical Map.

It is most preferred that the region outline and other regional information shown on the various Combined Region/Topical Maps be geometrically identical, such that when two or more such Combined Region/Topical Maps are overlaid onto each other, the regional information coincides or is registered. Thus, by overlaying two or more Combined Region/Topical Maps, this registration presents the user with a "single" map that combines the regional information and one or more sets of topical information that would require multiple maps in the use of the aforementioned travel planners. This embodiment of the present invention is shown in FIG. 10, wherein the Combined Region/Topical Maps shown in FIGS. 8 and 9 have been registered. Such a configuration allows the user to plan a trip based on two or more types of interests.

To easily distinguish which sites are related to a particular Combined Region/Topical Map when two or more such Combined Region/Topical Maps are overlaid, it is preferable to have the site locations on the Combined Region/Topical Map color-coded. The user can thereby easily refer to the booklet or other written material describing such points of interest and determine upon which of the overlaid Combined Region/Topical Maps the particular site is located. That is, all of the locations relating to a particular interest shown on a particular Combined Region/Topical Map will have the same color, which color is different from a color used for coding the locations of interest sites shown on Combined Region/Topical Maps depicting different interests. Alternatively, the colors on one Combined Region/Topical Map may be different shades of a single color to further differentiate on that map distinct characteristics of particular points of interest (e.g., the season when opened or closed, accessibility by rail or bus, etc.).

Although not preferred, a travel planner may comprise a single Combined Region/Topical Map which includes multiple types of points of interest. Such a Combined Region/multi-Topical Map can have multiple colors coding for the different topical interests shown on the map.

In still other embodiments, a Combined Region/Topical Map, or merely a Topical Map as described in the '752 patent and '159 application, can also be included in the travel planner to identify the locations of various customer services. For example, a rental car company may desire to have such a map showing its various pick-up and drop-off locations, or a hotel chain may desire such a map to enable a traveler to plan a trip staying at the same hotel chain in different parts of the region visited. Alternatively, the region can be a city, a national park, or a major event (e.g., World's Fair, Olympics), with various points of interest shown thereon. It is thus seen that various types of topical information can be used in a Combined Region/Topical Map, or a Topical Map used in conjunction with the Combined Region/Topical Map, to facilitate travel planning.

The travel planner of the invention may be contained in a compactly organized manner such as in a binder having compartments or sections or mechanical means for retaining or storing the various components of the planner. The maps may have registration holes so that they can be releasably secured into a ring binder, whereby various combinations and permutations of the Combined Region/Topical Map can be registered. Another embodiment of using registration holes in the Combined Region/Topical Map includes one or more nubs in the binder upon which the maps are placed. Alternatively, the registration nubs can be provided in the maps themselves, whereby the maps can be stacked and registered. Preferably, the Combined Region/Topical Map is provided folded in half with a particular crease line, such that when two or more of the Combined Region/Topical maps are overlaid, the crease lines facilitate registration of the maps for the user.

Having thus described specific embodiments of the invention, it should be apparent that various additions and/or modifications within the scope of the invention can be made to the design of the trip planner, and such are intended to be within the scope and spirit of the invention as defined by the following claims.

What is claimed is:

1. A compact, modular, and portable travel planner system which comprises: at least two flexible transparencies, each of which comprises a Combined Region/Topical Map including both regional information and particular topical point of interest information, the outlines of the regions of the two Combined Maps register with each other when said two Combined Maps are overlaid, and said transparencies being overlaid to provide a new map; and literature to which said transparencies are separably bound containing descriptive information relating to and corresponding with each particular point of interest on each of said transparencies, said at least two transparencies separably bound to a single piece of literature or said at least two transparencies separably bound to at least two different pieces of literature.

2. The travel planner system as defined by claim 1, wherein said Combined Region/Topical Map is comprised of a material upon which a user can write or draw.

3. The travel planner system as defined by claim 1, wherein the points of interest are identified by color.

4. The travel planner system as defined by claim 1, wherein the points of interest are identified numerically.

5. The travel planner system as defined by claim 1, wherein the points of interest are identified by geometric symbols.

6. The travel planner system as defined by claim 1, wherein the regional information comprises the location of features selected from the group consisting of roads, rail routes, rivers and other bodies of water, mountains, and major cities, and combination thereof.

7. The travel planner system as defined by claim 1, wherein the topical points of interest information comprises the location of features selected from the group consisting of charming villages, stately homes, castles, country gardens, museums, cathedrals, shopping locations, country markets, wineries, sporting or camping locations, hotels, car rental locations, and combinations thereof.

8. The travel planner system as defined by claim 1, further comprising means for registering said two or more Combined Region/Topical Maps Transparency.

9. A compact, modular, and portable travel planner, comprising:

(a) a top map having a definitive outline of a region which is marked with geographical features printed on a flexible transparency;

(b) at least one topical map each printed on a flexible transparency, each topical map having the outline of the top map printed thereon and having locations of sites that fall within a specific topical interest marked thereon;

each topical map being the same size as that of the definitive area outline of the top map such that the outlines of the topical maps correspond with and register with the definitive outline of the top map when the top map is placed over the topical map; and (c) literature containing descriptive information relating to and corresponding with each particular point of interest on each of said transparencies, said transparencies being separably bound to said literature, wherein said top map and at least one topical map transparencies are separably bound to a single piece of literature or said top map and at least one topical map transparencies are separably bound to at least two different pieces of literature.

10. The planner as defined by claim 9, wherein the top map is printed on a transparent sheet upon which the user can write.

11. The planner as defined by claim 9, wherein the sites marked on the topical map are denoted by color codes.

12. The planner as defined by claim 9, wherein the sites marked on the topical map are denoted by numeric codes.

13. The planner as defined by claim 9, wherein the sites marked on the topical map are denoted by symbols.

14. A compact, modular, portable travel planner, comprising:

(a) a top map having a definitive outline of a region which is marked with geographical features and which is printed on a flexible transparency upon which the user can write;

(b) at least one topical map each printed on a flexible transparency, each topical map having the outline of the top map printed thereon, wherein each outline is marked with the locations of sites that fall within specific topical interests and wherein each of the topical interests is visibly coded, each topical map outline being the same size as the definitive outline of the top map such that the outlines of the topical maps correspond with and register with the definitive outline of the top map when the top map is placed over the topical map; and (c) literature containing descriptive information relating to and corresponding with each particular point of interest on each of said transparencies, said transparencies being separably bound to said literature, wherein said top map and at least one topical map transparencies are separably bound to a single piece of literature or said top map and at least one topical map transparencies are separably bound to at least two different pieces of literature.

15. A method for planning a trip, comprising:

(i) providing at least two flexible transparencies, each of which comprises a Combined Region/Topical Map including regional information and topical information concerning particular points of interest;

(ii) providing literature relating to and corresponding with the particular topical points of interest on each of said at least two transparencies comprising the Combined Region/Topical Maps;

said transparencies and said literature being provided in a compact, modular, and portable system, and said transparencies being separably bound to said literature wherein said at least two transparencies are separably bound to a single piece of literature or said at least two transparencies are separably bound to at least two different pieces of literature, (iii) separating said transparencies from said literature and overlaying at least two of said transparencies and aligning the regional information displayed in each of the overlaid transparencies to produce a new map including regional information and information concerning at least two different topics;

(iv) correlating the particular topical points of interest on the new map with the description of each such point in said literature and determining the locations and proximities of desired topical points of interest on said new map; and (v) constructing on said new map a travel route among said desired topical points of interest.

* * * * *